United States Patent [19]
Chess

[11] Patent Number: 5,794,235
[45] Date of Patent: Aug. 11, 1998

[54] SYSTEM AND METHOD FOR DYNAMIC RETRIEVAL OF RELEVANT INFORMATION BY MONITORING ACTIVE DATA STREAMS

[75] Inventor: David Michael Chess, Mohegan Lake, N.Y.

[73] Assignee: International Business Machines Corporation, Armonk, N.Y.

[21] Appl. No.: 631,275

[22] Filed: Apr. 12, 1996

[51] Int. Cl.[6] .................................................. G06F 17/30
[52] U.S. Cl. ............................ 707/5; 707/6; 707/516; 707/531
[58] Field of Search .......................... 395/615, 605, 395/606, 685; 707/5, 6, 516, 531

[56] References Cited

U.S. PATENT DOCUMENTS

| | | | |
|---|---|---|---|
| 4,598,385 | 7/1986 | Kessels et al. | 364/900 |
| 4,747,072 | 5/1988 | Robinson et al. | 364/900 |
| 4,748,439 | 5/1988 | Robinson et al. | 340/146.2 |
| 5,303,361 | 4/1994 | Colwell et al. | 395/425 |
| 5,384,568 | 1/1995 | Grinberg et al. | 341/51 |
| 5,471,610 | 11/1995 | Kawaguchi et al. | 395/600 |
| 5,471,611 | 11/1995 | McGregor | 395/600 |
| 5,495,581 | 2/1996 | Tsai | 395/154 |
| 5,572,206 | 11/1996 | Miller et al. | 341/51 |
| 5,621,903 | 4/1997 | Luciw et al. | 395/326 |
| 5,625,654 | 4/1997 | Pinier et al. | 375/365 |

*Primary Examiner*—Wayne Amsbury
*Assistant Examiner*—Jean R. Homere
*Attorney, Agent, or Firm*—Perman & Green, LLP

[57] ABSTRACT

A system and method for monitoring the content of incoming data sets and retrieving data sets that may be related to the content of the incoming set. The system and method identify in an incoming data set one or more data tokens having a predetermined characteristic, such as membership in a particular part of speech within a language. The identified tokens are used as terms for searching a database. Results of the search are displayed to the user in a desired manner, such as by displaying a list of documents containing one or more of the search terms. The user can then select one of the listed documents and view information that may be relevant to the incoming document.

10 Claims, 2 Drawing Sheets

SYSTEM AND METHOD FOR DYNAMIC RETRIEVAL OF RELEVANT INFORMATION BY MONITORING ACTIVE DATA STREAMS

FIELD OF THE INVENTION

The invention relates to the retrieval of information relevant to an active data steam.

BACKGROUND OF THE INVENTION

In virtually all human activities, people interact with data streams of various kinds. People read electronic mail, take part in conversations and debates, listen to presentations, write papers, and read books. Data comes printed on paper, spoken into the air, down telephone wires, and as bits across networks. One of the primary functions of the mind is to associate names, words, facts, images, and concepts in experienced data streams with names, words, facts, images, and concepts stored in memory, and bring those stored salient items into, or near, conscious attention.

Limits of memory, convenience, attention, and speed, all apply to the associative duties of the mind. Salient facts and concepts can go by too fast to be recognized, there may be too many to pay attention to, there may not be time to follow up on, or even note down, an important-looking association, or a valuable association may not be in memory at all, or may be too deeply buried to be brought to attention when it is needed.

SUMMARY OF THE INVENTION

An object of the invention is to provide a system and method for monitoring incoming data, for instance an electronic mail message, identifying within the message data tokens of a predetermined type, and searching one or more databases for occurrences of those data tokens. In this way, a user can readily access data sets relevant to data tokens in the incoming data set.

One aspect of the invention is a system, comprising: a monitoring means having access to a stream of data which is also available to a user of the system; means for identifying within the data stream data tokens of a predetermined characteristic; means for searching a database for occurrences of the data tokens or occurrences of data similar to the data tokens; means for making the occurrences available to the user.

Another aspect of the invention is a method, comprising: scanning a data set and identifying one or more data tokens within the set; searching a database for occurrences of the one or more data tokens; generating a search result identifying the occurrences.

DETAILED DESCRIPTION OF THE INVENTION

Presented now is a preferred implementation of the invention, in the context of an electronic mail handling program for OS/2™ (or any similar multi-tasking operating system).

The invention provides monitoring capability with respect to terms in a received electronic mail message.

Figure 1:
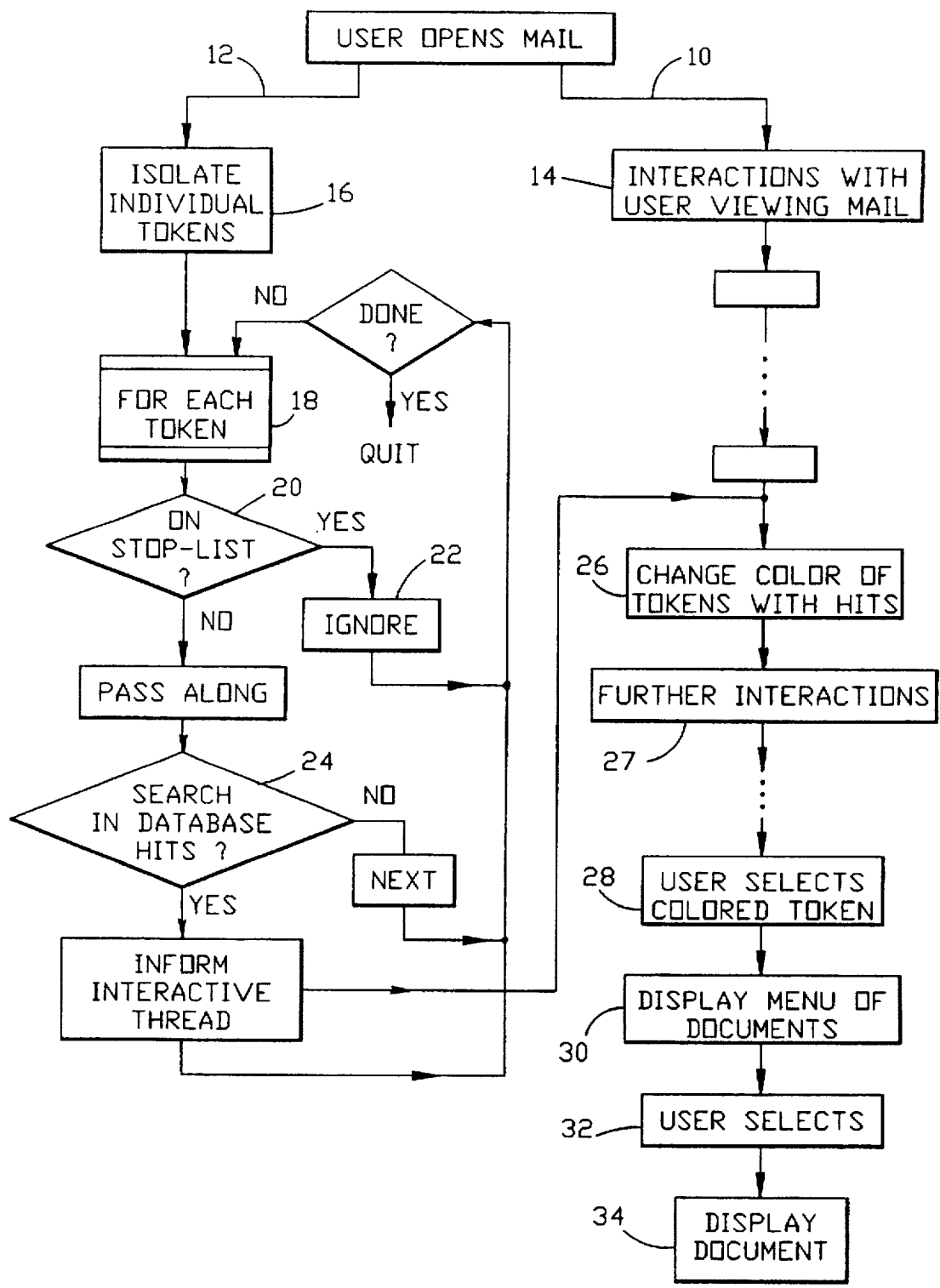
FIG. 1 is a flow diagram of the steps of a method in accordance with the invention.

Referring now to FIG. 1, when the user opens a piece of mail, two threads of execution are started. In an interactive thread 10, the first step is to display the contents of the mail to the user, and to allow him to move through the mail and read it (step 14).

A background thread 12 carries out the necessary background operations through a handling means carrying out the steps of the second thread. The first step (step 16) in this background thread is to initiate an analysis routine, which scans through the contents of the mail, and identifies and isolates all the possibly-relevant words and/or phrases ("tokens"). This is done by isolating tokens at word breaks and, possibly breaking words at inter-word punctuation. Words that are broken by end-of-line hyphens are joined. Also, common "nstop words", such as articles, pronouns, etc, are removed from consideration as tokens. This is done at step 18 by consulting, for each token found, a list of standard "stop" words (step 20), and discarding the token if it is found in the list (step 22), and moving on to the next token.

Each token that is not a stop word is passed along to a database search routine at step 24. The search routine looks up the token (using any known database searching technique) in a searchable database containing information that is likely to be of interest to the user. The search routine might also search on other tokens that are "similar" to the token, perhaps by first consulting a thesaurus. The user can specify one or more databases in which to perform this search. For example, one database might comprise all prior electronic mail that the user has received. Another might be a directory of information prepared by the user on people or companies he has previously had dealings with. If a token does not generate a hit, step 26, the routine returns to step 18 to analyze the next token.

For each token generating a hit in the search routine, the background thread 12 relays the identity of the token to interactive thread 10, along with the names of the documents found in the search. The unlabelled blocks followed by ellipses represent a number of user interactions that may be performed by the user while he browses the incoming data.

When the interactive thread 10 receives a message from the background thread, it can then notify the user that a particular token in the mail he is reading has generated a database search hit. This can be done, for instance, by changing the color of the token on the screen the user is viewing in order to indicate to the user that there is further data available for that token, step 26. Further user interactions between the user and the system may be undertaken at block 27. At step 28, the user can then select one of the highlighted tokens (for instance, by means of well known mouse or keyboard operations), and the interactive thread 10 can present a list (step 30) of the names of related documents uncovered in the search, such as by means of the familiar pop-up menu. It will be understood that modifications to this notification technique clearly are within the scope of this invention. For instance, the listing might present not only the title of the document generating a hit, but also a relevant excerpt therefrom.

At step 32, the user may then select one or more documents from the menu. In the event that the user wishes to browse the related document, a retrieval routine is dispatched to retrieve the full contents of those documents, and display them in separate windows on the display, step 34. Of course, the user might instead wish to retrieve only the most relevant portions of the documents, and a system and method in accordance with the invention can make allowance for such requests.

In accordance with the invention, the database that the search routine consults to find documents relating to tokens can be updated both automatically and manually. An automatic process can run, for instance, every night, indexing any new or changed documents that the user has read-access to, using indexing methods known to the art. At the user's discretion, he may also create new documents specifically for the purpose of making some information available to the database of step 24, and he may explicitly tag new or existing documents with key words for the database (key words that may not appear in the documents themselves).

The above process steps can be implemented either as hardware or as suitably programmed software running in a general purpose computer.

Figure 2:
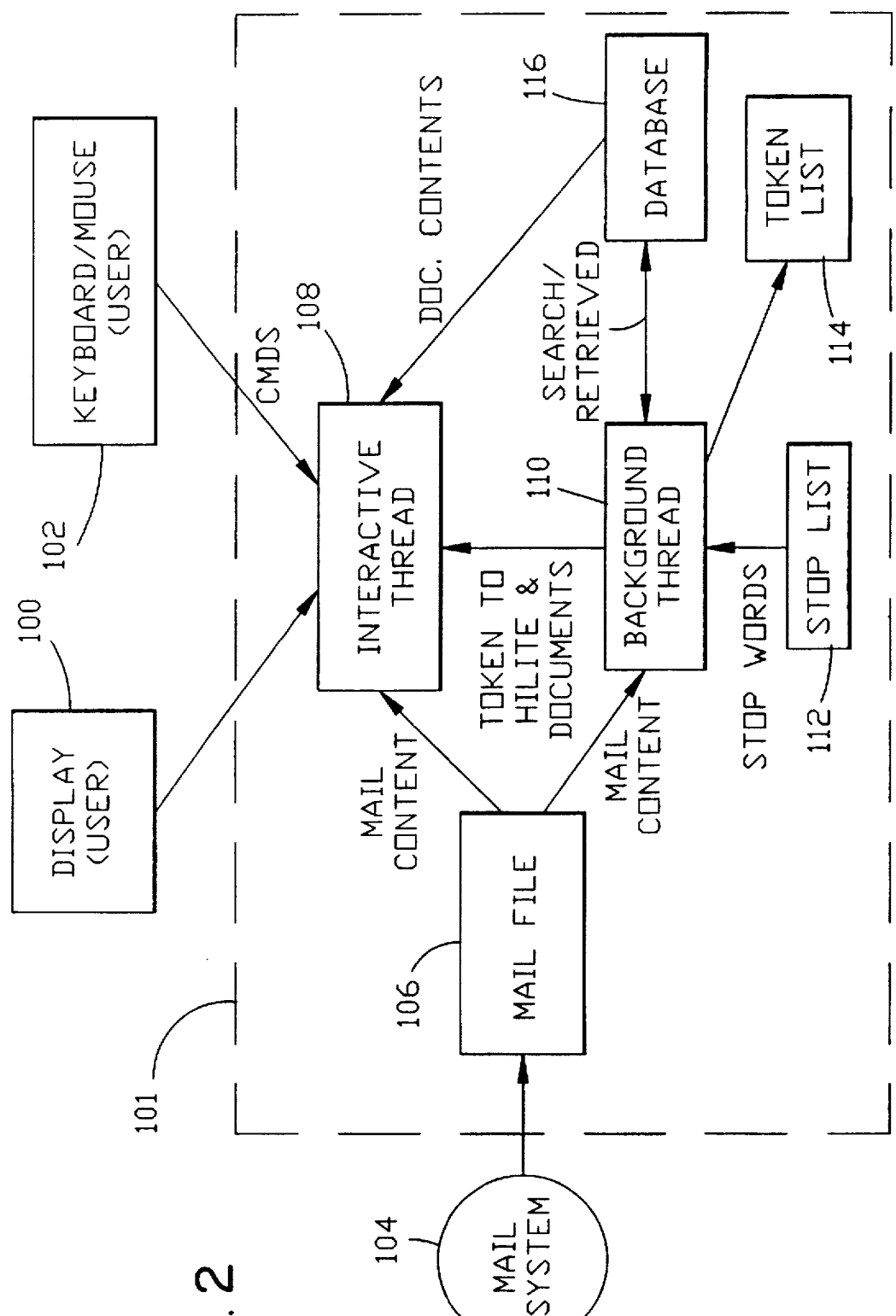
FIG. 2 is a functional block diagram of a system in accordance with the invention.

Referring now to FIG. 2, a system in accordance with the invention will now be described. Such a system comprises a presentation means 100, such as a CRT monitor, a data-input device 102 such as a keyboard and/or mouse, speech recognition device, or gesture recognition device. The presentation means can include standard video computer output, of various kinds (GUI based, textual, etc.), audio output (limited bandwidth but at high salience) and non-standard video output, such as heads-up displays.

External massages, in the form of electronic mail, are provided to the system by an external mail system 104. These messages are provided to the mail-handing process 106 of the system 101. System 101 can be a suitably programmed general purpose computer. Such mail handling processes are well known in the art. One example is Lotus Notes. The mail handling process then forwards the incoming mail to the interactive thread process 108 and the background thread process 110, which operate in the manner described above with respect to FIG. 1. The background thread 110 will have read access to: a stop list 112 that stores a list of words and/or phrases that are not to be considered; a token list 114, which can be modified manually by the user or automatically, which stores a list of all non-stop-word tokens found in the incoming data stream; and a searchable database 114, from which relevant documents can be retrieved and sent to the interactive thread process.

Examples

In addition to the electronic mail field, the invention will have applicability to the following areas: face-to-face or telephone conversations, conference and teleconference presentations, the spoken part of television programming, and other spoken-word streams, monitored by speech recognition software; visual data streams, monitored by a process that takes video input from the user's surroundings (things that the user is looking at, or might be looking at) and performs image-recognition at various levels.

What is claimed is:

1. A method, comprising the steps of:
    receiving and displaying an electronic mail message;
    identifying in the message all words that are not stop words;
    for each identified word in the message:
        searching one or more databases for an occurrence of an item likely to be related to the word; and
        if an occurrence is found, generating a notification message.

2. The method of claim 1, and further comprising a step of displaying the notification message.

3. The method of claim 1, wherein the item likely to be related to the word includes an occurrence of the word itself in a database being searched.

4. The method of claim 3, wherein the item likely to be related to the word includes another word known to be related to the word.

5. The method of claim 2, wherein the notification message comprises the identity of a file in the database that contains an occurrence of an item related to one of the identified words.

6. The method of claim 1, further comprising a step of:
    in response to receiving the notification message, retrieving, from a database, a file identified as containing an item related to one of the identified words.

7. A method for providing a user interface to a data processing system, comprising steps of:
    running a first process by, accessing a memory to retrieve a document that is stored in electronic form; and
    outputting the retrieved document to a display means for viewing by a user;
    the method further comprising running a second, concurrent process by,
        automatically examining the retrieved document so as to identify occurrences of a predetermined type of word or words;
        searching at least one database using the selected occurrences of the predetermined type of word or words to locate instances of at least one of a same word or a related word or words;
        outputting a message to the display means for viewing by the user, the message informing the user of located instances of the at least one of the same word or the related word or words;
        in response to the user selecting one of the located instances, accessing the database to retrieve a data file containing the located instance; and
        giving the user at least read access to the data file.

8. A method as in claim 7, wherein the predetermined type of word or words is a member of a set of words that are predetermined to not be excluded words.

9. A method as in claim 7, wherein the step of searching uses at least one of individual words or assemblages of words.

10. A method as in claim 7, wherein the stored document is an electronic mail message.

* * * * *